United States Patent
Vannithamby et al.

(10) Patent No.: US 9,462,629 B2
(45) Date of Patent: Oct. 4, 2016

(54) REDUCTION OF PACKET RETRANSMISSIONS IN DUAL CONNECTIVITY SYSTEMS

(71) Applicant: INTEL IP CORPORATION, Santa Clara, CA (US)

(72) Inventors: Rath Vannithamby, Portland, OR (US); Ali Koc, Portland, OR (US); Kathiravetpillai Sivanesan, Richardson, TX (US)

(73) Assignee: INTEL IP CORPORATION, Santa Clara, CA (US)

( * ) Notice: Subject to any disclaimer, the term of this patent is extended or adjusted under 35 U.S.C. 154(b) by 99 days.

(21) Appl. No.: 14/317,837

(22) Filed: Jun. 27, 2014

(65) Prior Publication Data

US 2015/0085646 A1 Mar. 26, 2015

Related U.S. Application Data

(60) Provisional application No. 61/883,127, filed on Sep. 26, 2013.

(51) Int. Cl.
*G08C 17/00* (2006.01)
*H04W 76/06* (2009.01)
(Continued)

(52) U.S. Cl.
CPC ............. *H04W 76/068* (2013.01); *H04L 1/12* (2013.01); *H04L 5/0037* (2013.01); *H04L 5/0048* (2013.01); *H04L 5/0055* (2013.01); *H04L 47/12* (2013.01); *H04L 47/122* (2013.01);

(Continued)

(58) Field of Classification Search
USPC .................................................. 370/331–336
See application file for complete search history.

(56) References Cited

U.S. PATENT DOCUMENTS

| | | | |
|---|---|---|---|
| 7,269,420 B2 * | 9/2007 | Heo ..................... | H04L 1/1845 370/335 |
| 8,107,815 B2 * | 1/2012 | Akasaka ............ | H04B 10/1125 398/66 |

(Continued)

FOREIGN PATENT DOCUMENTS

WO   WO 2013/059499   4/2013

OTHER PUBLICATIONS

3GPP TR 36.842, "Evolved Universal Terrestrial Radio Access (E-UTRAN); Study on Small Cell Enhancements for E-UTRA and E-UTRAN—Higher Layer Aspects", May 2013, V0.2.0, Release 12, pp. 38, Valbonne, France.

*Primary Examiner* — Phuc Tran
(74) *Attorney, Agent, or Firm* — Thorpe North & Western LLP

(57) ABSTRACT

Technology for reducing packet transmissions is disclosed. A master evolved node B (MeNB) configured for dual connectivity can receive one or more acknowledgements (ACKs) from a user equipment (UE) indicating packets that were successfully received at the UE from a secondary evolved node B (SeNB). The MeNB can receive, from the SeNB, packet delivery information for the SeNB. The MeNB can receive an indication from the SeNB of an air-interface connection loss between the SeNB and the UE. The MeNB can identify remaining packets that were not sent from the SeNB to the UE based, in part, on the ACKs received from the UE and the packet delivery information received from the SeNB, wherein the remaining packets are not sent to the UE due to the connection loss between the SeNB and the UE. The MeNB can send the remaining packets from the MeNB to the UE.

21 Claims, 7 Drawing Sheets

(51) Int. Cl.

| | |
|---|---|
| *H04W 24/04* | (2009.01) |
| *H04L 5/00* | (2006.01) |
| *H04L 12/801* | (2013.01) |
| *H04W 72/04* | (2009.01) |
| *H04W 48/16* | (2009.01) |
| *H04W 40/24* | (2009.01) |
| *H04W 88/08* | (2009.01) |
| *H04W 36/32* | (2009.01) |
| *H04L 29/08* | (2006.01) |
| *H04L 1/12* | (2006.01) |
| *H04L 12/803* | (2013.01) |
| *H04W 92/20* | (2009.01) |

(52) U.S. Cl.
CPC ........... *H04L67/025* (2013.01); *H04L 67/104* (2013.01); *H04W 24/04* (2013.01); *H04W 36/32* (2013.01); *H04W 40/24* (2013.01); *H04W 48/16* (2013.01); *H04W 72/0446* (2013.01); *H04W 72/0453* (2013.01); *H04W 88/08* (2013.01); *H04W 92/20* (2013.01)

(56) References Cited

U.S. PATENT DOCUMENTS

| | | | |
|---|---|---|---|
| 8,594,069 B2* | 11/2013 | Ho | H04W 99/00 370/349 |
| 9,100,890 B2* | 8/2015 | Chaponniere | H04L 1/16 |
| 9,125,112 B2* | 9/2015 | Gao | H04W 36/22 |
| 2004/0160925 A1* | 8/2004 | Heo | H04L 1/1845 370/335 |
| 2012/0008561 A1* | 1/2012 | Wang | H04W 36/02 370/328 |
| 2012/0093095 A1 | 4/2012 | Barbieri et al. | |
| 2012/0163337 A1 | 6/2012 | Hong et al. | |
| 2013/0201841 A1 | 8/2013 | Zhang et al. | |
| 2013/0201856 A1* | 8/2013 | Chaponniere | H04L 1/16 370/252 |
| 2013/0301439 A1* | 11/2013 | Heo | H04W 76/048 370/252 |
| 2014/0010180 A1* | 1/2014 | Lee | H04W 48/02 370/329 |
| 2015/0264631 A1* | 9/2015 | Zhang | H04W 48/08 370/329 |

* cited by examiner

REDUCTION OF PACKET RETRANSMISSIONS IN DUAL CONNECTIVITY SYSTEMS

RELATED APPLICATIONS

The present application claims priority to U.S. Provisional Patent Application No. 61/883,127, filed Sep. 26, 2013, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1A:
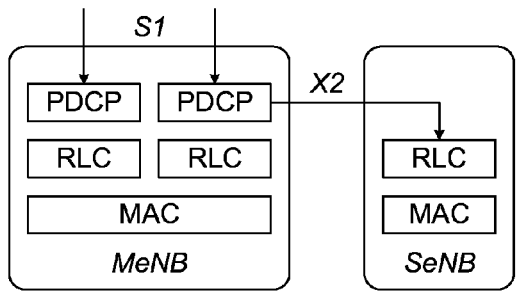
FIGS. 1A-1E illustrate dual connectivity architectures in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In 3GPP LTE Release 12, user equipments (UEs) may connect to more than one cell site simultaneously. For example, the UE may connect to a master evolved node B (MeNB) and at least one secondary evolved node B (SeNB) simultaneously. When the UE connects to two cells, the UE may receive data bearers from both cells at substantially the same time. The multiple bearers may be sent to the UE based on a location of an S1-U termination and location of the bearer split. In one example, the S1-U may be terminated at the MeNB and the bearer split may be performed at a packet data convergence protocol (PDCP) layer of the MeNB.

FIG. 1A illustrates an example of a dual connectivity architecture for a master evolved node B (MeNB) and a secondary evolved node B (SeNB). The S1-U may be terminated at the MeNB and the bearer split may occur at the MeNB. In addition, independent radio link controls (RLCs) may be present in the MeNB and the SeNB for the split bearers. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer and a media access channel (MAC) layer. The SeNB may include an RLC layer and a MAC layer. The MeNB may receive data and/or control information from higher layers at the PDCP layer (e.g., IP layer or application layer). In one example, the data or control information may be communicated from the PDCP layer in the MeNB to the RLC and MAC layers in the MeNB. In addition, the data or control information may be communicated, from the PDCP layer in the MeNB, to the RLC layer in the SeNB via an X2 interface.

Figure 1B:
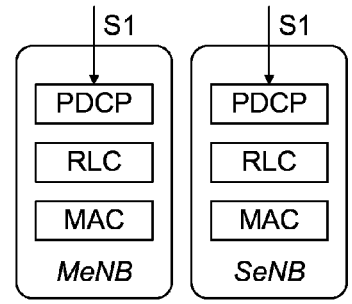

FIG. 1B illustrates another example of a dual connectivity architecture for a master evolved node B (MeNB) and a secondary evolved node B (SeNB). The S1-U may be terminated at the SeNB, and both the SeNB and the MeNB may include independent packet data convergence protocols (PDCPs), i.e., no bearer split. The MeNB and the SeNB may be connected to an Evolved Packet Core (EPC) via an S1 interface. For example, the MeNB and the SeNB may be connected to a serving gateway (S-GW) or mobility management entity (MME) via the S1 interface. The MeNB may include a PDCP layer, a radio link control (RLC) layer and a media access channel (MAC) layer. In addition, the SeNB may include a separate PDCP layer, RLC layer and MAC layer. The PDCP layer in the MeNB may receive data or control information from higher layers, and the PDCP layer in the SeNB may receive data or control information from higher layers.

Figure 1C:
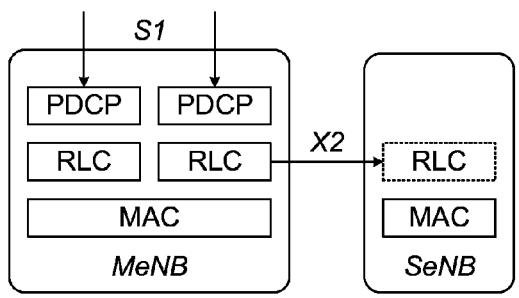

FIG. 1C illustrates yet another example of a dual connectivity architecture for a master evolved node B (MeNB) and a secondary evolved node B (SeNB). The S1-U may be terminated at the MeNB and the bearer split may occur at the MeNB. In addition, master-slave radio link controls (RLCs) may be present in the MeNB and the SeNB for the split bearers. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer and a media access channel (MAC) layer. The SeNB may include an RLC layer and a MAC layer. The MeNB may receive data and/or control information from higher layers (e.g., IP layer or application layer) at the PDCP layer. In one example, the data or control information may be communicated from the PDCP layer in the MeNB to the RLC and MAC layers in the MeNB. In addition, the data or control information may be communicated, from the RLC layer in the MeNB, to the RLC layer in the SeNB via an X2 interface.

Figure 1D:
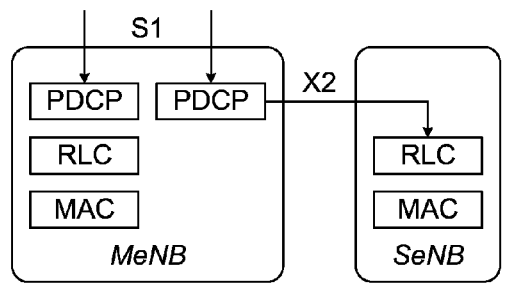

FIG. 1D illustrates yet another example of a dual connectivity architecture for a master evolved node B (MeNB) and a secondary evolved node B (SeNB). The S1-U may be terminated at the MeNB and no bearer split may occur at the MeNB. In addition, an independent radio link control (RLC) may be present at the SeNB. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer and a media access channel (MAC) layer. The SeNB may include an RLC layer and a MAC layer. The MeNB may receive data and/or control information from higher layers at the PDCP layer. In one example, the data or control information may be communicated from the PDCP layer in the MeNB to the RLC and MAC layers in the MeNB. In addition, the data or control information may be communicated, from the PDCP layer in the MeNB, to the RLC layer in the SeNB via an X2 interface.

Figure 1E:
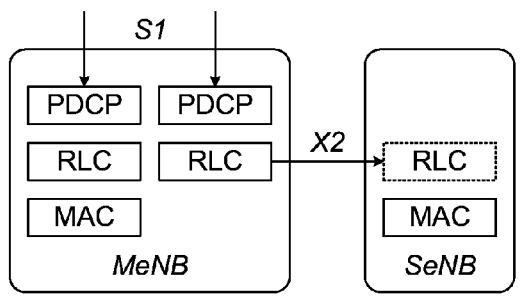

FIG. 1E illustrates yet another example of a dual connectivity architecture for a master evolved node B (MeNB) and a secondary evolved node B (SeNB). The S1-U may be terminated at the MeNB and no bearer split may occur at the MeNB. In addition, a master-slave radio link control (RLC) may be present for the SeNB bearers. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer and a media access channel (MAC) layer. The SeNB may include an RLC layer and a MAC layer. The MeNB may receive data and/or control information from higher layers (e.g., IP layer or application layer) at the PDCP layer. In one example, the data or control information may be communicated from the PDCP layer in the MeNB to the RLC and MAC layers in the MeNB. In addition, the data or control information may be communicated, from the RLC layer in the MeNB, to the RLC layer in the SeNB via an X2 interface.

The dual connectivity architectures described in FIGS. 1A-1E are further discussed in 3GPP Technical Review (TR) 36.842 Version 12.0.0.

Figure 1F:
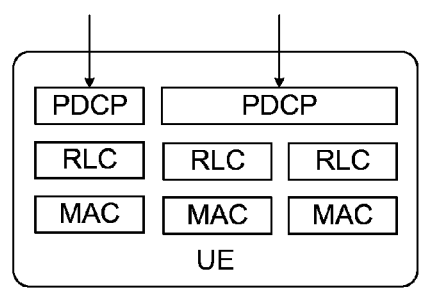
FIG. 1F illustrates an architecture of a user equipment (UE) operable to support dual connectivity in accordance with an example.

FIG. 1F illustrates exemplary architecture of a user equipment (UE). The UE may be configured to communicate with a master evolved node B (MeNB) and a secondary evolved node B (SeNB) in a dual connectivity architecture. The UE may include a PDCP layer, a RLC layer and a MAC layer. The PDCP layer in the UE may receive data and/or control information from the MeNB. In addition, the PDCP layer in the UE may receive data and/or control information from the SeNB. In one example, the data or control information may be communicated from the PDCP layer in the UE to lower layers in the UE (e.g., the RLC and MAC layers).

In one example, the UE may communicate with both the SeNB and the MeNB in a dual connectivity architecture. A packet data convergence protocol (PDCP) layer in the MeNB may receive packets from higher layers, such as the IP layer or the application layer. The packets may be PDCP/RLC packets. In addition, the packets may include data or control information. The PDCP layer in the MeNB may select a first portion of the packets received from the higher layers to be communicated to lower layers (e.g., RLC and MAC layers) in the MeNB. Thereafter, these packets may be communicated to the UE. In addition, the PDCP layer in the MeNB may select a second portion of the packets received from the higher layers to be communicated to the RLC layer in the SeNB via an X2 interface. The RLC layer may segment the packets and send the segmented packets to the UE. The PDCP layer may select the first portion and the second portion according to a bearer split ratio. As an example, the PDCP layer in the MeNB may receive 10 PDCP packets from the higher layers, wherein each PDCP packet is 1000 bytes. Out of the 10 PDCP packets, 4 PDCP packets may be communicated to the lower levels in the MeNB and 6 PDCP packets may be communicated to the RLC layer in the SeNB according to the bearer split ratio. The SeNB may segment the 6 PDCP packets into smaller RLC packets. For example, the SeNB may segment the 6 PDCP packets into 24 RLC packets (i.e., each RLC packet is 250 bytes). The SeNB may send the RLC packets to the UE.

Although it may be undesirable to support dual connectivity with moderate or high mobility, dual connectivity may be supported with low mobility. When the UE is in low mobility, a connection between the UE and the SeNB may deteriorate and eventually be lost. When the connection is lost between the SeNB and the UE, the SeNB can no longer send packets to the UE. The packets may include PDCP/RLC packets. When the connection is lost and no enhancements are being implemented, the SeNB may send packet delivery information (e.g., information about the delivered packets and the undelivered packets) to the MeNB, so that the MeNB can send/resend the packets that did not reach the UE.

The UE may have received some or all of the packets from the SeNB before the connection was lost between the UE and the SeNB. However, the UE may be unable to successfully send acknowledgements (ACKs) to the SeNB for the packets received due to the connection loss between the UE and the SeNB. In other words, the UE may attempt to send the ACKs to the SeNB, but the ACKs may not be successfully received at the SeNB due to the deteriorated uplink. As an example, the UE may receive 10 packets from the SeNB, but could only send ACKs for 4 of the packets. Therefore, the SeNB may be unaware that the later 6 packets were successfully received at the UE.

When the connection is lost between the UE and the SeNB, the MeNB may account for the packets that were successfully received at the UE via the SeNB. The MeNB may determine which packets were not received at the UE before the connection loss, and only send these packets to the UE. For example, the SeNB may successfully send 4 packets out of a set of 10 packets to the UE, and then the connection is lost between the SeNB and the UE. Rather than the MeNB sending all 10 packets to the UE (as performed in legacy systems), the MeNB may send only the remaining 6 packets in the set of 10 packets. In other words, the MeNB may determine which packets had been received, as well as not received, at the UE when the connection was lost. The MeNB may recover pending packets at the SeNB (i.e., packets that are unable to be sent due to the connection loss), rather than unnecessarily sending all of the packets to the UE. As a result, data latency can be reduced, overall resource utilization/data throughput can be increased, and power consumption at the UE can be reduced. In addition, the technology described can be applicable to both downlink and uplink scenarios.

In another example, the SeNB may successfully send 3 packets out of a set of 10 packets to the UE, and then the connection is lost between the SeNB and the UE. The UE may attempt to send ACKs for the 3 packets that were successfully received at the UE before the connection is lost. Whether the SeNB successfully receives the ACKs or does not receive the ACKs for the 3 packets, the MeNB may send the remaining 7 packets in the set of 10 packets to the UE. However, in legacy systems, if the SeNB does not receive the ACKs for the 3 packets, the MeNB may send all 10 packets to the UE. In other words, the UE may receive packets that were already previously received at the UE in legacy systems.

Figure 2:
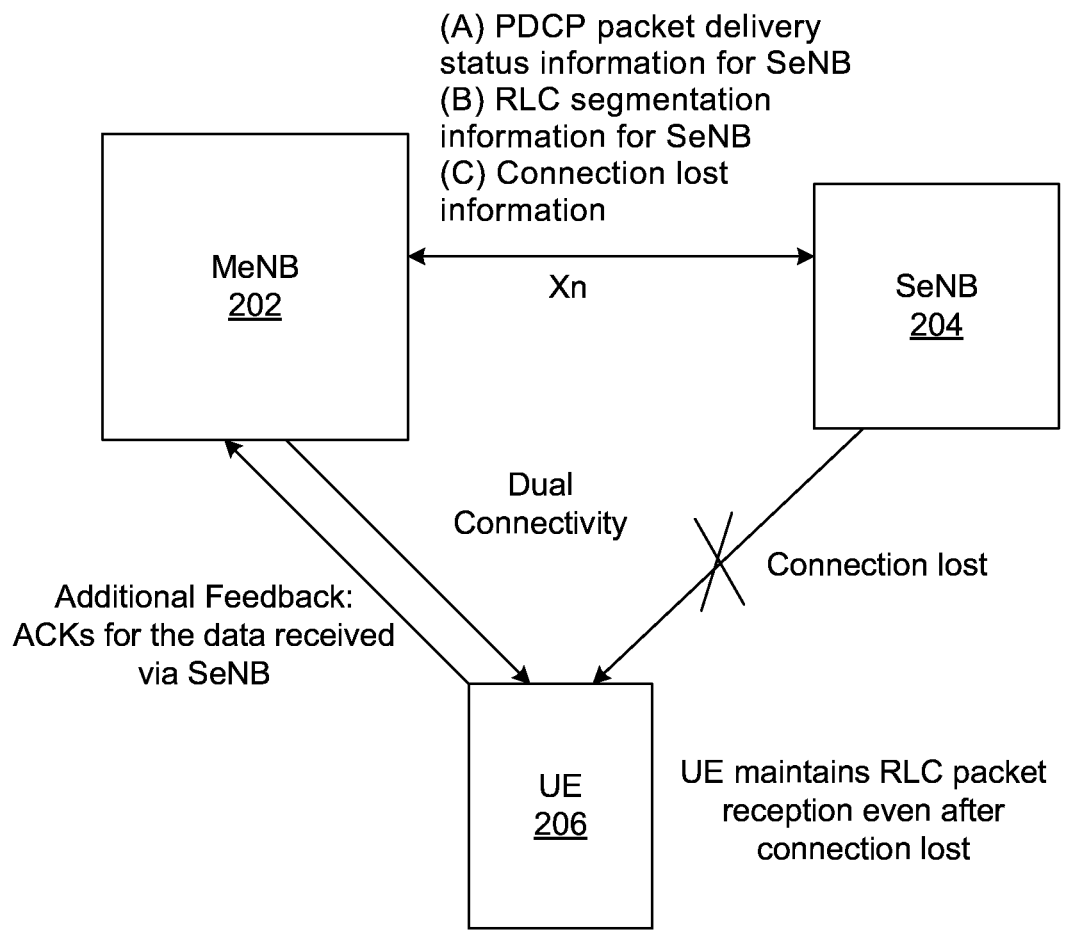
FIG. 2 illustrates a master evolved node B (MeNB) sending packets to a user equipment (UE) in lieu of a secondary evolved node B (SeNB) when a connection loss occurs between the UE and the SeNB in accordance with an example.

FIG. 2 illustrates a master evolved node B (MeNB) 202 sending packets to a user equipment (UE) 206 in lieu of a secondary evolved node B (SeNB) 204 when a connection loss occurs between the UE 206 and the SeNB 204. In general, the UE 206 may communicate packets with both the SeNB 204 and the MeNB 202 in dual connectivity. The packets may include PDCP/RLC packets. For example, the SeNB 204 may send 10 packets to the UE 206. The UE 206 may send acknowledgements (ACKs) for packets that were successfully received to the SeNB 204. The UE 206 may also send negative acknowledgements (NACKs) for the packets that were unsuccessfully received to the SeNB 204. In addition, the MeNB 202 may send packets to the UE 206, and the UE 206 can send ACKs/NACKs to the MeNB 202 for the packets that were successfully or unsuccessfully received, respectively, from the MeNB 202.

In one example, the air-interface connection between the SeNB 204 and the UE 206 may be lost. The connection may be lost due to the low mobility of the UE 206. Alternatively, the connection may be lost due to channel variation. When the connection is lost, the SeNB 204 may be unable to send packets to the UE 206. In addition, the UE 206 may be unable to send ACKs/NACKs for packets that were successfully received at the UE 206 before the connection was lost.

The UE 206 may maintain packet reception information, even after the connection is lost between the UE 206 and the SeNB 204. In legacy systems, the UE 206 may flush packet reception information (i.e., not store which packets were or were not received at the UE 206 from the SeNB 204) when the connection is lost between the UE 206 and the SeNB 204. The UE 206 may send ACKs/NACKs to the MeNB 202 for the packets that were received at the UE 206 from the SeNB 204 according to the packet reception information when the connection is lost. Alternatively, the UE 206 may periodically send the ACKs/NACKs to the MeNB 202. In other words, the MeNB 202 may periodically receive information about which packets are received or not received at the UE 206 from the SeNB 204.

In one configuration, the MeNB 202 may allocate resources for the UE 206 to send the ACKs/NACKs to the MeNB 202. For example, the MeNB 202 may detect the connection loss between the UE 206 and the SeNB 204, and then allocate resources for the UE 206 to send the ACKs/NACKs to the MeNB 202. Alternatively, the MeNB 202 may grant a request for resources received from the UE 206, via a random access channel (RACH), to enable the UE 206 to periodically send the ACKs/NACKs to the MeNB 202. In another example, the MeNB 202 may grant a request for resources, received with uplink data from the UE 206, to enable the UE 206 to periodically send the ACKs/NACKs to the MeNB 202. Therefore, the MeNB 202 may know which packets (e.g., RLC packets) were successfully received at the UE 206 from the SeNB 204, and which packets were not successfully received at the UE 206 from the SeNB 204.

The SeNB 204 may send packet delivery information, as well as an indication of the connection loss between the SeNB 204 and the UE 206, to the MeNB 202 via an X2 interface. The packet delivery information may include PDCP/RLC packet delivery status information for the SeNB 204, as well as RLC segmentation information. The PDCP/RLC packet delivery status information may describe packets that were successfully received at the UE 206 from the SeNB 204 before the connection loss, as well as packets that were not successfully received at the UE 206 from the SeNB 204 and/or unable to be sent from the SeNB 204 after the connection loss. The SeNB 204 may determine which packets were successfully received based on ACKs/NACKs received from the UE 206. In one example, the SeNB 204 may receive the ACK/NACKs from the UE 206 via the MeNB 202 after the connection is lost between the UE 206 and the SeNB 204. In addition, the RLC segmentation information may describe how the PDCP packets are segmented into RLC packets at the SeNB 204.

The MeNB 202 may use the ACKs/NACKs received from the UE 206, the PDCP/RLC packet delivery status information received from the SeNB 204, and the RLC segmentation information received from the SeNB 204 in order to determine which packets to send to the UE 206. The MeNB 202 may select the packets that were not already received at the UE 206 based on the ACKs/NACKs, PDCP/RLC packet delivery status information, and the RLC segmentation information. The MeNB 202 may send these packets to the UE 206. In other words, since the packet transmissions go through the MeNB 202, the MeNB 202 may already have a copy of the packets that are to be transmitted to the UE 206. Therefore, the UE 206 may not unnecessarily receive packets from the MeNB 202 that were already received from the SeNB 204. In one configuration, the MeNB 202 may send the packets to the UE 206 in a downlink scenario, as well as an uplink scenario.

As a non-limiting example, the SeNB 204 may include a PDCP packet to be sent to the UE 206. The PDCP packet may be 1000 bytes. In addition, the PDCP packet may be segmented into smaller RLC packets. For example, the PDCP packet may be segmented into 5 RLC packets, wherein each RLC packet is 200 bytes. Thus, the SeNB 204 may be sending 5 RLC packets to the UE 206. The SeNB 204 may send 600 bytes (i.e., the first 3 RLC packets) to the UE 206 before a connection loss between the UE 206 and the SeNB 204. Therefore, the SeNB 204 may be unable to send the remaining 400 bytes (i.e., the last 2 packets) to the UE 206. The UE 206 may send ACKs to the MeNB 202 indicating that the UE 206 has successfully received the 600 bytes from the SeNB 204. In addition, the UE 206 may send NACKs to the MeNB 202 indicating that the remaining 400 bytes were not successfully received from the SeNB 204. In addition, the MeNB 202 may receive the PDCP/RLC packet delivery status information from the SeNB 204 indicating that the SeNB 204 sent 600 bytes to the UE 206, but could not send the remaining 400 bytes to the UE 206. In addition, the MeNB 202 may receive the RLC segmentation information indicating that the PDCP packet was segmented into five smaller RLC packets. Based on the ACKs/NACKs, the PDCP/RLC packet delivery status information, and the RLC segmentation information, the MeNB 202 may determine that the 600 bytes were successfully received at the UE 206 and the 400 bytes were not received at the UE 206. Therefore, the MeNB 202 may send the 400 bytes to the UE 206, without resending the 600 bytes to the UE 206.

In one configuration, the SeNB 204 may be unable to send packets to the UE 206 due to a connection loss between the SeNB 204 and the UE 206. Therefore, the SeNB 204 may send the packets to the MeNB 204, and the MeNB 204 may forward the packets to the UE 206. As a non-limiting example, the SeNB 204 may send 200 bytes out of 1000 bytes to the UE 206 before the connection is lost. The SeNB may send the remaining 800 bytes to the MeNB 202, wherein the MeNB 202 may forward the remaining 800 bytes to the UE 206. Therefore, the UE 206 may not receive packets from the MeNB 202 that were already successfully received at the UE 206 from the SeNB 204.

Figure 3:
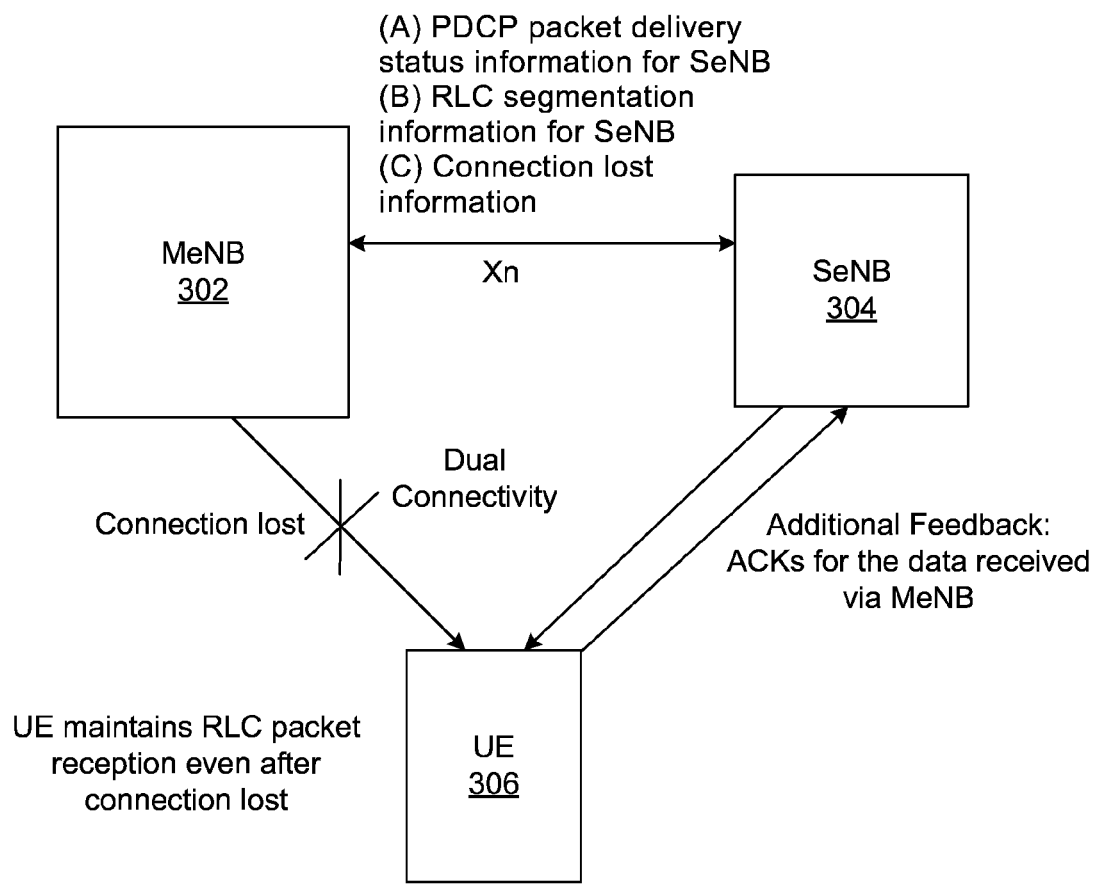
FIG. 3 illustrates a secondary evolved node B (SeNB) sending packets to a user equipment (UE) in lieu of a master evolved node B (MeNB) when a connection loss occurs between the UE and the MeNB in accordance with an example.

FIG. 3 illustrates a secondary evolved node B (SeNB) 304 sending packets to a user equipment (UE) 306 in lieu of a master evolved node B (MeNB) 302 when a connection loss occurs between the UE 306 and the MeNB 302. In general, the UE 306 may communicate with both the SeNB 304 and the MeNB 302 in dual connectivity. For example, the MeNB 302 may send packets to the UE 306 and the SeNB 304 may send packets to the UE 306. The packets may include PDCP/RLC packets. In one example, the air-interface connection between the MeNB 302 and the UE 306 may be lost. The connection may be lost due to the low mobility of the UE 306. Alternatively, the connection may be lost due to channel variation. When the connection is lost, the MeNB 302 may be unable to send packets to the UE 306. In addition, the UE 306 may be unable to send the MeNB 302 ACKs/NACKs for packets that were successfully received at the UE 306 before the connection was lost.

The UE 306 may maintain packet reception information, even after the connection is lost between the UE 306 and the MeNB 302. The UE 306 may send ACKs/NACKs to the SeNB 304 for the packets that were received at the UE 306 from the MeNB 302 according to the packet reception information. The UE 306 may send the ACKs/NACKs to the SeNB 304 upon the connection between the UE 306 and the MeNB 302 being lost. Alternatively, the UE 306 may periodically send the ACKs/NACKs to the SeNB 304. In other words, the SeNB 304 may periodically receive information about which packets are received at the UE 306 from the MeNB 302.

In one configuration, the SeNB 304 may allocate resources for the UE 306 to send the ACKs/NACKs to the SeNB 304. For example, the SeNB 304 may detect the connection loss between the UE 306 and the MeNB 302, and then allocate resources for the UE 306 to send the ACKs/NACKs to the SeNB 304. Alternatively, the SeNB 304 may grant a request for resources received from the UE 306, via a random access channel (RACH), to enable the UE 306 to periodically send the ACKs/NACKs to the SeNB 304. In another example, the SeNB 304 may grant a request for resources, received with uplink data from the UE 306, to enable the UE 306 to periodically send the ACKs/NACKs to the SeNB 304. Therefore, the SeNB 304 may know which packets (e.g., RLC packets) were successfully received at the UE 306 from the MeNB 302, and which packets were not successfully received at the UE 306 from the MeNB 302.

The MeNB 302 may send packet delivery information, as well as an indication of the connection loss between the MeNB 302 and the UE 306, to the SeNB 304 via an X2 interface. The packet delivery information may include PDCP/RLC packet delivery status information for the MeNB 302, as well as RLC segmentation information. The PDCP/RLC packet delivery status information may describe packets that were successfully received at the UE 306 from the MeNB 302 before the connection loss, as well as packets that were not successfully received at the UE 306 from the MeNB 306 and/or unable to be sent from the MeNB 306 after the connection loss. The MeNB 302 may determine which packets were successfully received based on ACKs/NACKs received from the UE 306. In one example, the MeNB 302 may receive the ACK/NACKs from the UE 306 via the SeNB 304 when the connection is lost between the UE 306 and the MeNB 302. In addition, the RLC segmentation information may describe how the PDCP packets are segmented into RLC packets at the MeNB 302.

The SeNB 202 may select the packets that were not already received at the UE 306 based on the ACKs/NACKs, PDCP/RLC packet delivery status information, and the RLC segmentation information. In other words, the SeNB 202 may identify the packets that were lost (i.e., unable to be sent to the UE 306, and then send the packets to the UE 306. In one example, the packets (e.g., PDCP PDUs or RLC SDUs) may be forwarded from the MeNB 302 to the SeNB 304 over the X2 interface when the MeNB connection is lost, and then the SeNB 204 may send the packets to the UE 306. Therefore, the UE 306 may not unnecessarily receive packets from the SeNB 304 that were already received from the MeNB 302. In one configuration, the SeNB 304 may send the packets to the UE 306 in a downlink scenario, as well as an uplink scenario.

Figure 4:
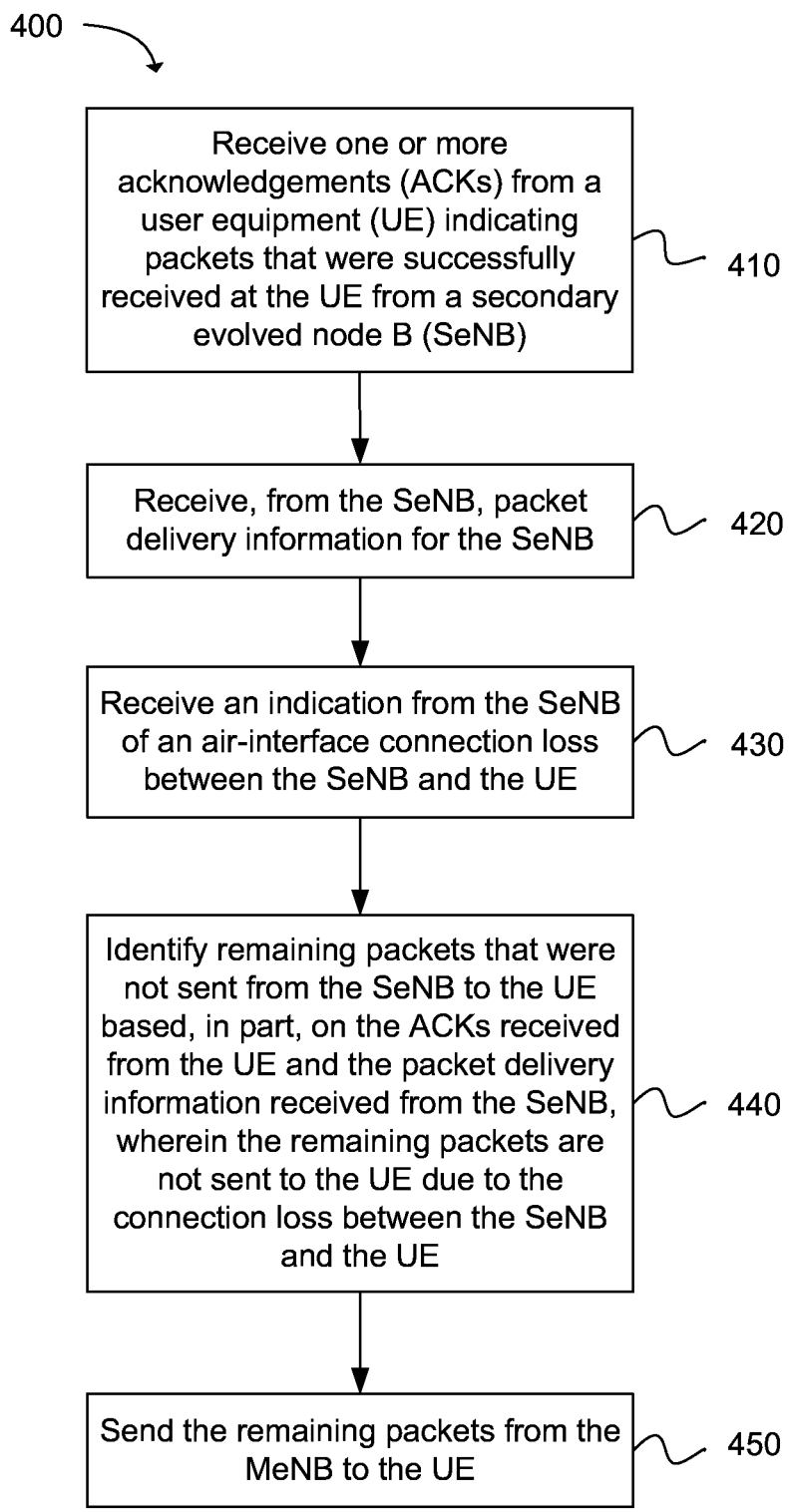
FIG. 4 depicts functionality of computer circuitry of a master evolved node B (MeNB) operable to reduce packet retransmissions in accordance with an example.

Another example provides functionality 400 of computer circuitry of a master evolved node B (MeNB) configured for dual connectivity that is operable to reduce packet retransmissions, as shown in the flow chart in FIG. 4. The functionality may be implemented as a method or the functionality may be executed as instructions on a machine, where the instructions are included on at least one computer readable medium or one non-transitory machine readable storage medium. The computer circuitry can be configured to receive one or more acknowledgements (ACKs) from a user equipment (UE) indicating packets that were successfully received at the UE from a secondary evolved node B (SeNB), as in block 410. The computer circuitry can be configured to receive, from the SeNB, packet delivery information for the SeNB, as in block 420. The computer circuitry can be configured to receive an indication from the SeNB of an air-interface connection loss between the SeNB and the UE, as in block 430. The computer circuitry can be configured to identify remaining packets that were not sent from the SeNB to the UE based, in part, on the ACKs received from the UE and the packet delivery information received from the SeNB, wherein the remaining packets are not sent to the UE due to the connection loss between the SeNB and the UE, as in block 440. The computer circuitry can be configured to send the remaining packets from the MeNB to the UE, as in block 450.

In one example, the packet delivery information includes packet data convergence protocol (PDCP)/radio link control (RLC) packet delivery status information for the SeNB and RLC segmentation information, the PDCP/RLC packet delivery status information and the RLC segmentation information being received at the MeNB from the SeNB via an X2 interface. In one configuration, the computer circuitry can be further configured to: detect the connection loss between the UE and the SeNB; and allocate resources for the UE to send the ACKs to the MeNB.

In one example, the computer circuitry can be further configured to grant a request for resources received from the UE, via a random access channel (RACH), to enable the UE to periodically send the ACKs to the MeNB. In addition, the computer circuitry can be further configured to grant a request for resources, received with uplink data from the UE, to enable the UE to periodically send the ACKs to the MeNB.

In one example, the computer circuitry can be further configured to receive the ACKs from the UE over an air-interface signaling channel. In one configuration, the RLC segmentation information describes a segmentation of PDCP packets into RLC packets at the SeNB. In another configuration, the packets include RLC packets.

Figure 5:
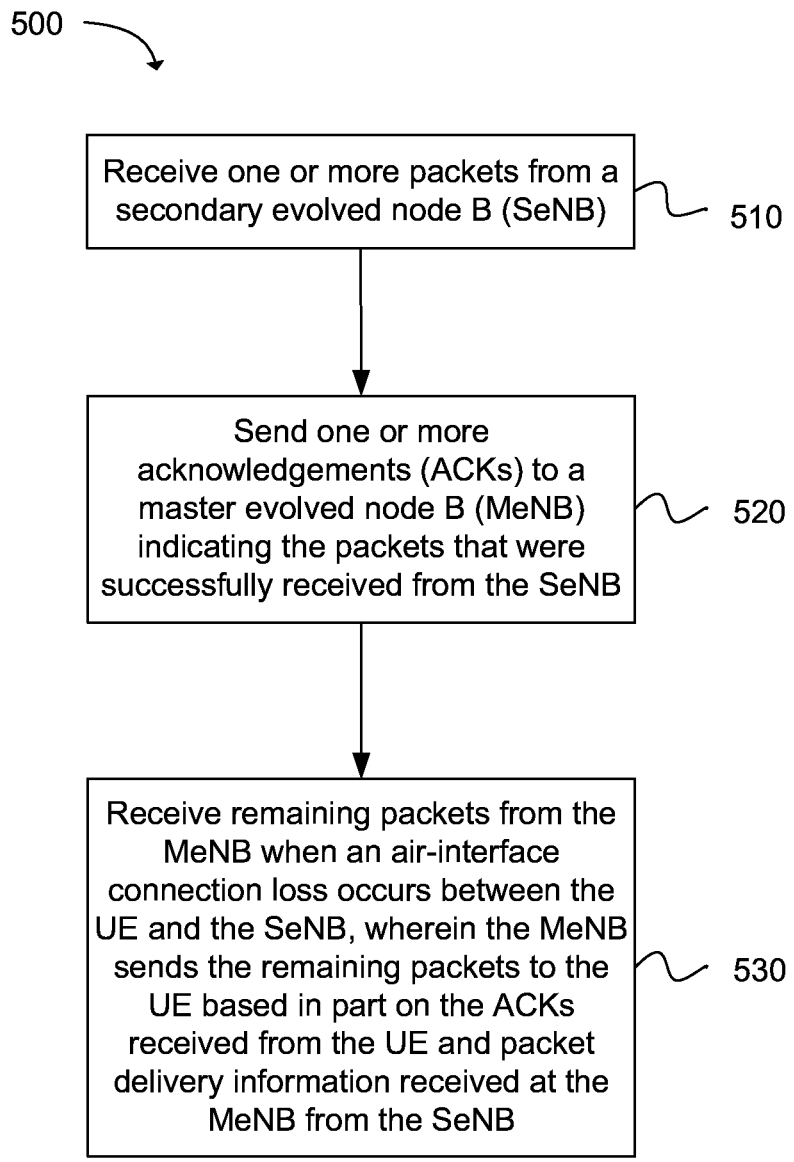
FIG. 5 depicts functionality of computer circuitry of a user equipment (UE) operable to support dual connectivity in accordance with an example.

Another example provides functionality 500 of computer circuitry of a user equipment (UE) operable to support dual connectivity, as shown in the flow chart in FIG. 5. The functionality may be implemented as a method or the functionality may be executed as instructions on a machine, where the instructions are included on at least one computer readable medium or one non-transitory machine readable storage medium. The computer circuitry can be configured to receive one or more packets from a secondary evolved node B (SeNB), as in block 510. The computer circuitry can be configured to send one or more acknowledgements (ACKs) to a master evolved node B (MeNB) indicating the packets that were successfully received from the SeNB, as in block 520. The computer circuitry can be configured to receive remaining packets from the MeNB when an air-interface connection loss occurs between the UE and the SeNB, wherein the MeNB sends the remaining packets to the UE based in part on the ACKs received from the UE and packet delivery information received at the MeNB from the SeNB, as in block 530.

In one example, the packet delivery information includes packet data convergence protocol (PDCP) packet delivery status information for the SeNB and radio link control (RLC) segmentation information. In another example, the UE supports dual connectivity with the SeNB and the MeNB.

In one example, the computer circuitry can be further configured to send one or more negative acknowledgements (NACKs) to the MeNB indicating packets that were not successfully received from the SeNB. In addition, the computer circuitry can be further configured to store an RLC packet reception event after the air-interface connection loss occurs between the UE and the SeNB. In one configuration, the air-interface connection loss between the UE and the SeNB occurs due to mobility of the UE or channel variation.

In one example, the computer circuitry can be further configured to send a request for resources to the MeNB, the resources enabling the UE to send the ACKs to the MeNB. In another example, the request for resources is sent to the MeNB via a random access channel (RACH) or along with uplink data. In yet another example, the UE includes an antenna, a touch sensitive display screen, a speaker, a microphone, a graphics processor, an application processor, an internal memory, or a non-volatile memory port.

Figure 6:
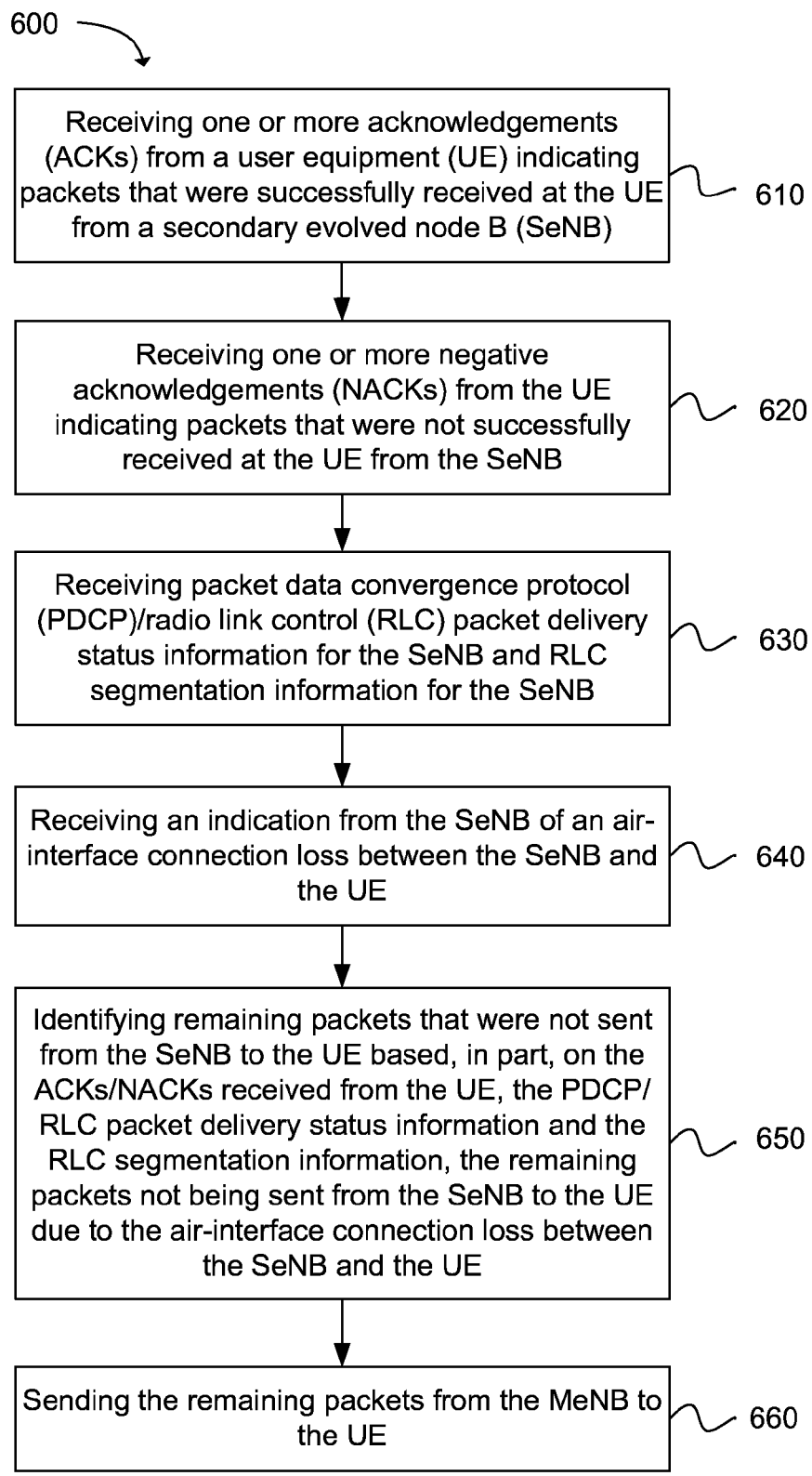
FIG. 6 depicts a flowchart of a method for reducing packet retransmissions in a dual connectivity system in accordance with an example.

Another example provides a method 600 for reducing packet retransmissions in a dual connectivity system, as shown in the flow chart in FIG. 6. The method may be executed as instructions on a machine, where the instructions are included on at least one computer readable medium or one non-transitory machine readable storage medium. The method can include the operation of receiving one or more acknowledgements (ACKs) from a user equipment (UE) indicating packets that were successfully received at the UE from a secondary evolved node B (SeNB), as in block 610. The method can include the operation of receiving one or more negative acknowledgements (NACKs) from the UE indicating packets that were not successfully received at the UE from the SeNB, as in block 620. The method can include the operation of receiving packet data convergence protocol (PDCP)/radio link control (RLC) packet delivery status information for the SeNB and RLC segmentation information for the SeNB, as in block 630. The method can include the operation of receiving an indication from the SeNB of an air-interface connection loss between the SeNB and the UE, as in block 640. The method can include the operation of identifying remaining packets that were not sent from the SeNB to the UE based, in part, on the ACKs/NACKs received from the UE, the PDCP/RLC packet delivery status information and the RLC segmentation information, the remaining packets not being sent from the SeNB to the UE due to the air-interface connection loss between the SeNB and the UE, as in block 650. The method can include the operation of sending the remaining packets from the MeNB to the UE, as in block 660.

In one example, the method can include receiving the PDCP/RLC packet delivery status information and the RLC segmentation information from the SeNB via an X2 interface. In addition, the method can include receiving a request for resources from the UE, via a random access channel (RACH), to enable the UE to send the ACKs to the MeNB; or receiving a request for resources along with uplink data from the UE, the resources enabling the UE to send the ACKs to the MeNB.

Figure 7:
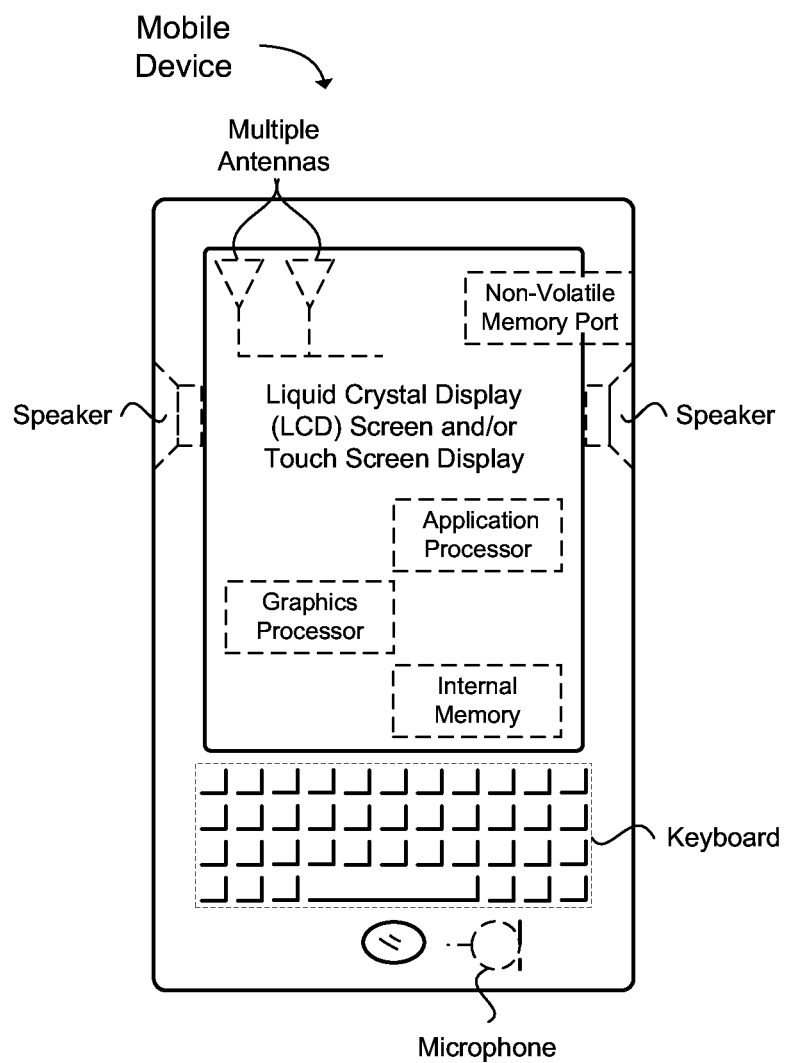
FIG. 7 illustrates a diagram of a wireless device (e.g., UE) in accordance with an example.

FIG. 7 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A master evolved node B (MeNB) configured for dual connectivity that is operable to reduce packet retransmissions, the MeNB having computer circuitry configured to:
   receive one or more acknowledgements (ACKs) from a user equipment (UE) indicating packets that were successfully received at the UE from a secondary evolved node B (SeNB);
   receive, from the SeNB, packet delivery information for the SeNB;
   receive an indication from the SeNB of an air-interface connection loss between the SeNB and the UE;
   identify remaining packets that were not sent from the SeNB to the UE based, in part, on the ACKs received from the UE and the packet delivery information received from the SeNB, wherein the remaining packets are not sent to the UE due to the connection loss between the SeNB and the UE; and
   send the remaining packets from the MeNB to the UE.

2. The computer circuitry of claim 1, wherein the packet delivery information includes packet data convergence protocol (PDCP)/radio link control (RLC) packet delivery status information for the SeNB and RLC segmentation information, the PDCP/RLC packet delivery status information and the RLC segmentation information being received at the MeNB from the SeNB via an X2 interface.

3. The computer circuitry of claim 1, further configured to:
   detect the connection loss between the UE and the SeNB; and
   allocate resources for the UE to send the ACKs to the MeNB.

4. The computer circuitry of claim 1, further configured to grant a request for resources received from the UE, via a random access channel (RACH), to enable the UE to periodically send the ACKs to the MeNB.

5. The computer circuitry of claim 1, further configured to grant a request for resources, received with uplink data from the UE, to enable the UE to periodically send the ACKs to the MeNB.

6. The computer circuitry of claim 1, further configured to receive the ACKs from the UE over an air-interface signaling channel.

7. The computer circuitry of claim 1, wherein the RLC segmentation information describes a segmentation of PDCP packets into RLC packets at the SeNB.

8. The computer circuitry of claim 1, wherein the packets include RLC packets.

9. A user equipment (UE) operable to support dual connectivity, the UE having computer circuitry configured to:
   receive one or more packets from a secondary evolved node B (SeNB);
   send one or more acknowledgements (ACKs) to a master evolved node B (MeNB) indicating the packets that were successfully received from the SeNB; and
   receive remaining packets from the MeNB when an air-interface connection loss occurs between the UE and the SeNB, wherein the SeNB sends an indication to the MeNB of an air-interface connection loss between the SeNB and the UE and the MeNB sends the remaining packets to the UE based in part on the ACKs received from the UE and packet delivery information received at the MeNB from the SeNB.

10. The computer circuitry of claim 9, wherein the packet delivery information includes packet data convergence protocol (PDCP) packet delivery status information for the SeNB and radio link control (RLC) segmentation information.

11. The computer circuitry of claim 9, wherein the UE supports dual connectivity with the SeNB and the MeNB.

12. The computer circuitry of claim 9, further configured to send one or more negative acknowledgements (NACKs) to the MeNB indicating packets that were not successfully received from the SeNB.

13. The computer circuitry of claim 9, further configured to store an RLC packet reception event after the air-interface connection loss occurs between the UE and the SeNB.

14. The computer circuitry of claim 9, wherein the air-interface connection loss between the UE and the SeNB occurs due to mobility of the UE or channel variation.

15. The computer circuitry of claim 9, further configured to send a request for resources to the MeNB, the resources enabling the UE to send the ACKs to the MeNB.

16. The computer circuitry of claim 15, wherein the request for resources is sent to the MeNB via a random access channel (RACH) or along with uplink data.

17. The computer circuitry of claim 9, wherein the UE includes an antenna, a touch sensitive display screen, a speaker, a microphone, a graphics processor, an application processor, an internal memory, or a non-volatile memory port.

18. A method for reducing packet retransmissions in a dual connectivity system, the method comprising:
   receiving one or more acknowledgements (ACKs) from a user equipment (UE) indicating packets that were successfully received at the UE from a secondary evolved node B (SeNB);
   receiving one or more negative acknowledgements (NACKs) from the UE indicating packets that were not successfully received at the UE from the SeNB;
   receiving packet data convergence protocol (PDCP)/radio link control (RLC) packet delivery status information for the SeNB and RLC segmentation information for the SeNB;
   receiving an indication from the SeNB of an air-interface connection loss between the SeNB and the UE;
   identifying remaining packets that were not sent from the SeNB to the UE based, in part, on the ACKs/NACKs received from the UE, the PDCP/RLC packet delivery status information and the RLC segmentation information, the remaining packets not being sent from the SeNB to the UE due to the air-interface connection loss between the SeNB and the UE; and sending the remaining packets from the MeNB to the UE.

19. The method of claim 18, further comprising receiving the PDCP/RLC packet delivery status information and the RLC segmentation information from the SeNB via an X2 interface.

20. The method of claim 18, further comprising:

receiving a request for resources from the UE, via a random access channel (RACH), to enable the UE to send the ACKs to the MeNB; or receiving a request for resources along with uplink data from the UE, the resources enabling the UE to send the ACKs to the MeNB.

21. At least one non-transitory machine readable storage medium comprising a plurality of instructions adapted to be executed to implement the method of claim 18.

* * * * *